Sept. 27, 1949.                    C. HAAS                    2,483,341
                                SCAFFOLDING
                           Filed April 8, 1946

INVENTOR.
Charles Haas
BY
           Fritz G. Hochwald
                AGENT

Patented Sept. 27, 1949

2,483,341

UNITED STATES PATENT OFFICE 2,483,341

SCAFFOLDING

Charles Haas, Bilbao, Spain

Application April 8, 1946, Serial No. 660,377
In Great Britain July 27, 1945

4 Claims. (Cl. 304—40)

The invention relates to scaffolding, platforms, huts, shuttering for reinforced concrete, and the like, using rectangular metal tubes.

A principal object of the invention is to provide readily detachable clamping devices suitable to join metal tubes of substantially rectangular cross-section at a right angle or parallel to each other or coaxially end to end.

Other objects and advantages will be apparent from a consideration of the specification and claims.

The accompanying drawings illustrate diagrammatically the various positions which the tubes in a scaffolding may have to assume when assembled and show, by way of example, various devices suitable to secure the tubes in their position.

The assembling of the tubes according to the invention can take place by the followings means:

(A) Placing one face of a tube in contact with that of another and exerting, by any mechanical means, a pressure sufficient to produce resistance to sliding capable of keeping the tubes in position whatever may be their relative position (tubes forming together a fixed or variable angle as indicated in the diagrammatic Figure 1, or having their axes parallel as in the case of Figure 2).

(B) Placing the tubes end to end and fixing them, by means of a mechanical clamping joint, at their inside (Figure 3).

Figures 4 and 5 represent joints of the first category in which the tubes placed in contact face to face are held in position by the resistance to sliding exerted by mechanical means.

Figure 4 represents a joint consisting of a cradle $b$ in which the tubes T and T' are placed face to face. The clamping pressure is imparted by a hinged cramp $p$ clamped against the tubes by means of an eyelet screw $v$ and nut $e$. This joint is suitable for tubes placed perpendicularly one with respect to the other and it constitutes an application of the diagram of Figure 1.

Figure 1:
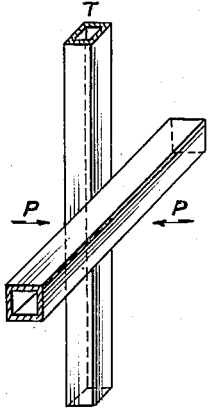
Figure 2:
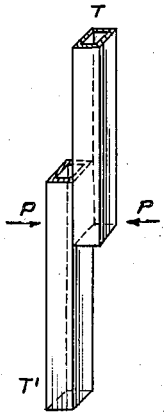
Figure 5:
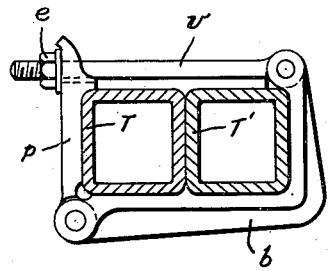
Figure 5 represents a joint for tubes placed parallel one alongside and in contact with the other in the cradle $b$, the pressure being applied by a device consisting of an eyelet screw $v$ with its nut $e$ which draws the hinged cramp $p$ against the tubes. This joint constitutes an application of the diagram of Figure 2.
Figure 3:
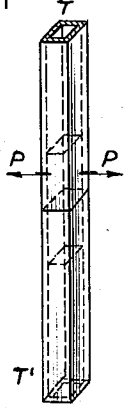
Figure 7:
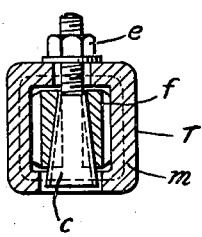
Figures 6 and 7 represent joints of the second category in which the tubes are arranged end to end and fastened by means of a mechanical clamping joint engaging their inner faces.
Figure 6:
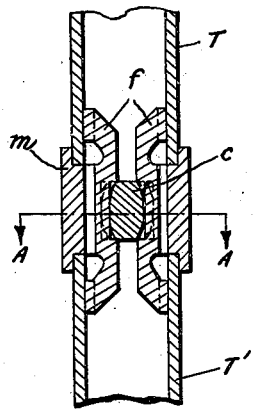
Figure 4:
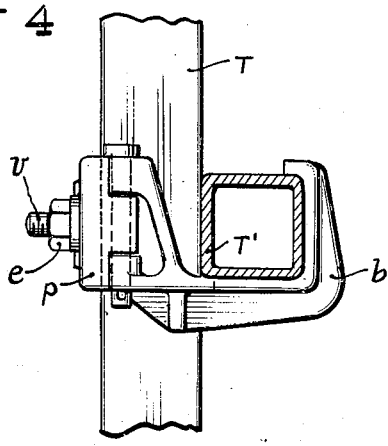

Figure 6 shows in longitudinal section an interior clamping joint constituting one of the applications of the diagram of Figure 3, and Figure 7 is a section on the line A—A of Figure 6. The tubes T and T' are placed in contact with the lower edges of a sleeve $m$ which carries the clamping device. The latter consists of a screw wedge $c$ provided with a clamping nut $e$ separating as desired the two clamping arms $f$ and thus fastening the two tubes together.

Details of the structure described are susceptible of a wide variation as will be apparent to those skilled in the art, and various modifications can be made without departing from the spirit of the invention.

I claim:

1. In a scaffolding, metal tubes substantially rectangular in cross-section placed coaxially end to end, clamping means having separable clamping arms, said clamping arms extending from the inner face of one of said tubes to the inner face of the next tube, means for wedging said clamping arms against the inner faces of said tubes, and means for maintaining said clamping arms in frictional non-sliding engagement with said inner faces.

2. In a scaffolding as claimed in claim 1, means engaging the coaxially arranged tubes and holding said tubes in spaced relationship.

3. In a scaffolding, metal tubes substantially rectangular in cross section placed at a right angle to each other in face to face contact, a clamp comprising two jaws, each jaw defining a rectangular seating for two sides of each of said tubes, a pin pivotally connecting said jaws to each other, and screw clamp means at one of said jaws for screwing the clamp to said tubes.

4. In a scaffolding, metal tubes substantially rectangular in cross section placed side by side parallel to each other in face to face contact, a clamp comprising two jaws forming a rectangular seating for said tubes, one of said jaws forming a seating for two parallel tubes and gripping in addition the outer side of one of said tubes, the other jaw forming a seating for the outer side of the other tube, a bolt pivotally connected to one of said jaws and engaging the other jaw, and screw clamping means on said bolt for drawing the jaws together.

CHARLES HAAS.

REFERENCES CITED

The following references are of record in the file of this patent:

UNITED STATES PATENTS

| Number | Name | Date |
|---|---|---|
| 1,015,821 | Moore | Jan. 30, 1912 |
| 1,716,904 | Siderits | June 11, 1929 |
| 1,835,473 | Davidson | Dec. 8, 1931 |
| 2,044,700 | Jones | June 16, 1936 |
| 2,101,317 | Lemieu | Dec. 7, 1937 |
| 2,165,221 | Bruton | July 11, 1939 |
| 2,185,948 | Pimm | Jan. 2, 1940 |
| 2,210,465 | Orsenigo | Aug. 6, 1940 |
| 2,399,681 | Kemner | May 7, 1946 |

FOREIGN PATENTS

| Number | Country | Date |
|---|---|---|
| 758,368 | France | Jan. 15, 1934 |
| 489,838 | Great Britain | Aug. 4, 1938 |
| 851,582 | France | Jan. 11, 1940 |